(12) United States Patent
Arellano Morales et al.

(10) Patent No.: US 11,919,443 B1
(45) Date of Patent: Mar. 5, 2024

(54) LIGHT GUIDE

(71) Applicant: Valeo Vision, Bobigny (FR)

(72) Inventors: Abril Paulina Arellano Morales, Bobigny (FR); Emigdio Leon, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/173,338

(22) Filed: Feb. 23, 2023

(51) Int. Cl.
*B60Q 3/64* (2017.01)
*F21V 8/00* (2006.01)

(52) U.S. Cl.
CPC .............. *B60Q 3/64* (2017.02); *G02B 6/0028* (2013.01)

(58) Field of Classification Search
CPC ... B60Q 3/64; B60Q 3/10; B60Q 3/14; G02B 6/0028; B60K 37/02
USPC .................................................. 362/511, 489
See application file for complete search history.

(56) References Cited

U.S. PATENT DOCUMENTS

| | | | |
|---|---|---|---|
| 6,953,271 B2 * | 10/2005 | Aynie | F21S 43/14 362/540 |
| 7,400,439 B2 | 7/2008 | Holman | |
| 7,654,679 B2 * | 2/2010 | Mezouari | G02B 6/001 362/555 |
| 7,744,230 B2 * | 6/2010 | Mezouari | G02B 6/001 362/555 |
| 2006/0065900 A1 | 3/2006 | Hsieh et al. | |
| 2009/0185389 A1 | 7/2009 | Tessnow et al. | |
| 2013/0003399 A1 | 1/2013 | de Lamberterie | |
| 2015/0167940 A1 | 6/2015 | Ng et al. | |
| 2015/0168626 A1 | 6/2015 | Schinagl | |
| 2015/0211710 A1 | 7/2015 | Speier | |

FOREIGN PATENT DOCUMENTS

| | | |
|---|---|---|
| DE | 102012107437 A1 | 6/2014 |
| EP | 1154198 A2 | 11/2001 |
| EP | 2587120 B1 | 4/2016 |
| EP | 3081854 A1 | 10/2016 |
| ES | 2882856 T3 | 12/2021 |
| JP | 6007280 B1 | 10/2016 |
| WO | 06089450 A2 | 8/2006 |

\* cited by examiner

*Primary Examiner* — Laura K Tso
(74) *Attorney, Agent, or Firm* — Young Basile Hanlon & MacFarlane, P.C.

(57) ABSTRACT

A light system including: a light source; and a light guide aligned with the light source so that light from the light source directs light into the light guide, wherein the light guide has a concave region that light extends through so that the light extending from the concave region homogeneously illuminates an article of manufacture within an interior of a vehicle.

20 Claims, 6 Drawing Sheets

LIGHT GUIDE

FIELD

The present teachings relate to a light guide and more specifically a light guide to illuminate interior components with a homogeneous distribution, amount, intensity, or a combination thereof of light.

BACKGROUND

Vehicles include many different types of interior lights. Some types of lights inside of a vehicle are dome lights, spot lights, panel lights, accent lights, and instrument lights. Each of these lights illuminate some portion of the interior so that an occupant may view some portion of a vehicle. These lights may illuminate a region of an interior of a vehicle. These lights may provide differing amounts of lights within the vehicle. For example some located may be very well lit whole other locations may have very little light.

Thus, there is a need for a light system that provides homogenous lighting to a specific component. There is a need for a light guide that equally distributes light over a length of a surface, a width of a surface, or both. There is a need for a system and method where light is directed to a component in close proximity and light is provided in a uniform distribution. It would be desirable to have a light guide that directs light out of the light guide at predetermined location at a predetermined angle.

SUMMARY

The present teachings provide: a light system comprising: a light source; and a light guide aligned with the light source so that light from the light source directs light into the light guide, wherein the light guide has a concave region that light extends through so that the light extending from the concave region homogeneously illuminates an article of manufacture within an interior of a vehicle.

The present teachings provide: a light system comprising: a light source; a guiding device; and a light guide in communication with the guiding device, the light guiding device is aligned with the light source so that light from the light source extends into the light guide through the guiding device and extends along a length of the light guide, wherein the light guide has a concave region that light extends through to provide a uniform distribution of light to an article of manufacture within an interior of a vehicle; wherein the light guide is configured to be located a predetermined distance from the article of manufacture to provide the uniform distribution of light on the article of manufacture.

The present teachings provide a light and/or light guide that provides homogenous lighting to a specific component. The present teachings provide a light guide that equally distributes light over a length of a surface, a width of a surface, or both. The present teachings provide a system and method where light is directed to a component in close proximity and light is provided in a uniform distribution. The present teachings provide a light guide that directs light out of the light guide at predetermined location at a predetermined angle.

DETAILED DESCRIPTION

Figure 1:
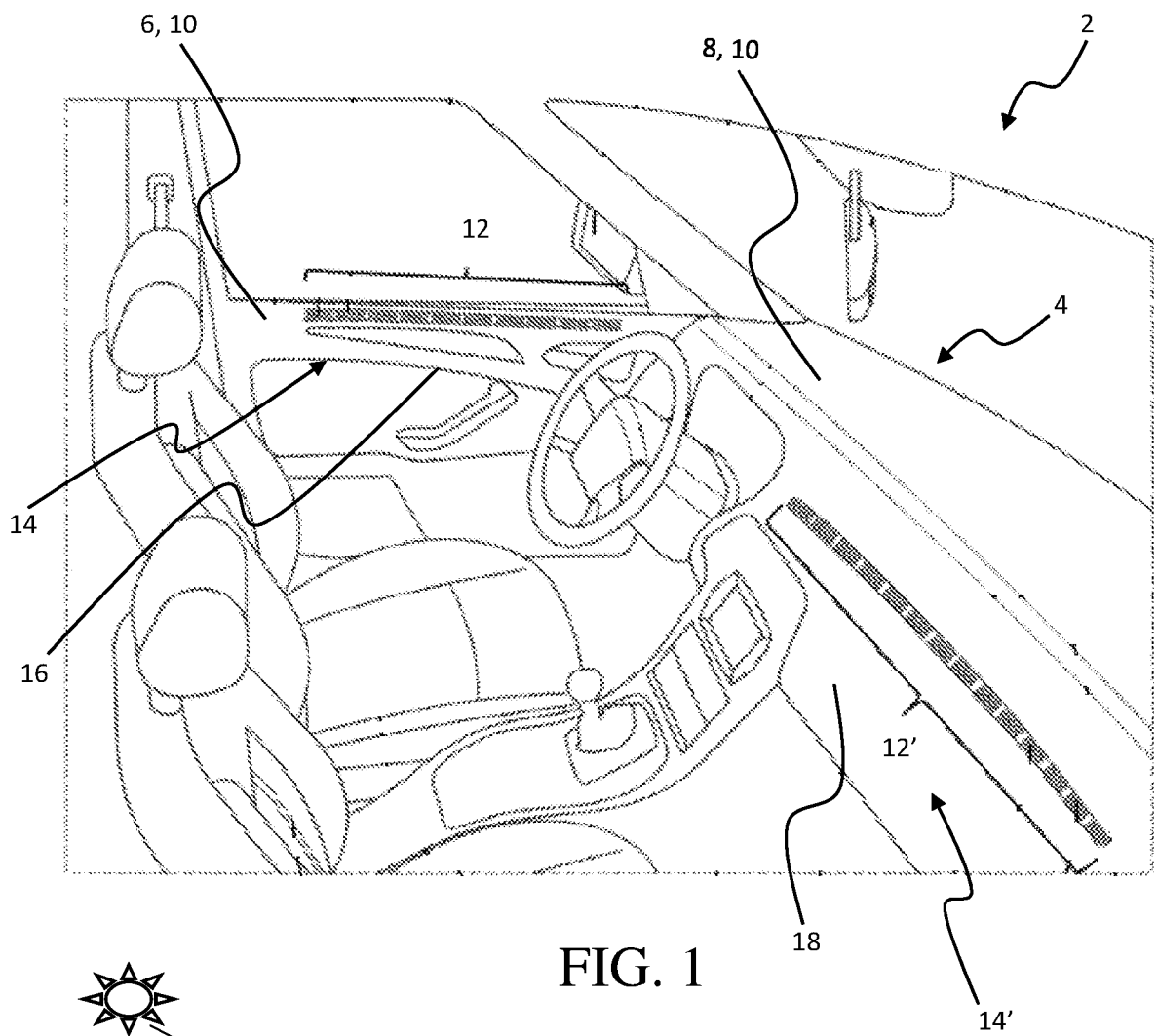
FIG. 1 is a side perspective view of an interior of a vehicle.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light into an interior of the vehicle.

The light system may direct some light directly at internal components. The light system may directly illuminate a component, indirectly illuminate a component, or both. The light system may be integrated into an article of manufacture (e.g., an internal component). The light system may be partially located within an article of manufacture (e.g., a component) and partially extend out of the article of manufacture. The light system may be embedded in a component and have a surface that is exposed so that light extends out of the surface. The light system may be connected to an article of manufacture. The light system may be an assembly. The light system may be a sealed light system that is integrated into a component of a vehicle. The light system may be a sub-assembly that is included in a larger light system. The light system may be integrated into another light system and may function to be part of the light system. The light system may project light out of a component of the vehicle. The light system may include multiple different lights or light sub-systems that each provide a different function, color, or both. The light systems may be multiple light systems or light sources stacked one above the other, side by side, within different planes, within a same plane and projecting in different direction, integrated into a single light system, or a combination thereof. The light system may have multiple smaller light systems or light sources. The light systems may be covered by one or more outer lenses or may be free of an outer lens. The light system may include one or more lights that direct light into a light guide and the light guide may distribute the light. The light system and the light guide may provide light to one or more articles of manufacture.

The light system may project light onto am article of manufacture of a vehicle. The light system projects a light onto some article of manufacture such as an interior component of the vehicle. For example, the light system may project onto a door handle, window switches, cup holder, floor, door, arm rest, back seat, console, glove box, dashboard, foot well, or a combination thereof. The article of manufacture may be any component of a vehicle. Preferably, the article of manufacture is an interior of a vehicle.

The interior of the vehicle includes a front, a first side, a second side, a rear, a roof, a floor, one or more seats, one or more doors, handles, door buttons, console buttons, dashboard buttons, a dashboard, glove box, storage compartments, or a combination thereof. The interior may include components that are located at a shoulder level of an occupant or lower. The light systems may be located at shoulder level or below to illuminate components while the vehicle is moving. The light system may direct light a short distance so that the desired components may be illuminated without causing interference to the driver. The light system may direct light at an interior component a distance of about 1 cm or more, about 2 cm or more, about 3 cm or more, about 4 cm or more, about 5 cm or more, or about 6 cm or more. The light system may direct light at an interior component a distance of about 1 m or less, about 50 cm or less, about 25 cm or less, about 15 cm or less, or about 10 cm or less. One light system may illuminate one component. For example, one light system ay illuminate a door panel (including the buttons, arm rest, door handle). The light system may include one or more light sources.

The light sources function to produce light, direct light onto one or more articles of manufacture, or both. The light source may be a device or a plurality of devices that create light and the light extends outward from the light source. The light source may produce a high beam, a low beam, a blending beam, a warning light, a communication, ornamentation, a signal, a decoration, or a combination thereof. The light sources may have different functions. The light source may comprise a plurality of lights or may be a single light source within a set of light sources. The plurality of lights may be in one set or group of light sources. The light source may be a single light that projects light. In another example, a light source may direct light in a first direction. The light sources may direct light in a first direction. The light sources may include one or more lights or a plurality of lights. When multiple light sources are present one or more lights may be turned on depending on the color, intensity, or both desired by an occupant.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 1 or more, 2 or more, 3 or more, 4 or more, 5 more, 7 or more, 9 or more, or 11 or more lights that produce light and combine together to form the light extending from the light system. The sets of light sources may include 20 or less, 18 or less, 16 or less, or 14 or less lights that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 lights. The number of light sources in a part of the light may dependent upon a size of the region to be illuminated, a size of an area to be illuminated, a size of a light guide, a length of a light guide, a radius of a light guide, a distance between the light guide and a component to be illuminated, a width of a light guide, or a combination thereof. Thus, the light source may be one or more lights, two or more lights, or three or more lights. If more than one light source is present, the light sources may be selectable individually. For example, each light source may be individually illuminated depending on a selection of the user (e.g., color, light intensity). The light source may be static. The light sources may be free of movement. The light source may be fixed. The light sources may be static within the light system. The light sources may be fixed and the light from the light source may be moved, bent, directed, or a combination thereof by optical elements, textured portions, micro-optics, optics, or reflectors (e.g., optics). Each device (e.g., light or LED) of the light source may be turned on and off individually. The light sources may be illuminated in a sequence. The light sources may work together as a set of light sources to create light. All of the light sources may be a same color or provide a same color light. For example, all of the lights may be white or non-colored light. All of the light sources may be a single-color light source. The light source (e.g., one or more lights) may be located proximate to a guiding device.

The guiding device functions to receive light, guide light into a light guide, or both. The guiding device may reflect light, funnel light, block some light, permit light to only exit into a guiding device, guide light along a longitudinal axis, or a combination thereof. The guiding device may house all or a portion of a light source. The guiding device may be located adjacent to a light source. The guiding device may taper towards a light source. The guiding device may mix light so that the light is internally reflected. The guiding device may guide all of the light from the light source into the light guide. The guiding device may be directly connected to a light guide or a unitary part of the light guide. The guiding device may be located between a light source and a light guide. The guiding device may be made of or include metal, plastic, opaque material, transparent material, a polymer, acrylic, polycarbonate, polyvinyl chloride, polypropylene, polystyrene, polyethylene, or a combination thereof. The guiding device may be made of a same or similar material as the light guide. The guiding device may guide light into a light guide along the longitudinal axis and then prevent light from extending into regions of the light guide outside of the guiding device. The guiding device may extend around an end of the light guide. The guiding device may allow some light into the light guide while blocking other light from extending into the light guide.

The light guide functions to direct light along its longitudinal axis and then outward from the light guide. The light guide may have internal reflections that allow light to extend along the longitudinal axis. The light guide may have optics that allow and/or facilitate some or all of the light to exit the light guide. The light guide may spread light. The light guide may distribute a homogeneous distribution, amount, intensity, or a combination thereof of light along a length, a width, or both (e.g., an area) of an article of manufacture. For example, the distribution, amount, and/or intensity may be how light is spread across an article of manufacture such that the light on the article of manufacture is free of hot spots, spots free of light, or both, and an intensity of light on the article of manufacture is substantially the same when measured at any point on the article of manufacture. The light guide may prevent a single focus of light, a hot spot, a line of light, or a combination thereof. The light guide may spread light, create an umbrella of light, a cone of light, a cross-section of light that is generally triangular in shape, or a combination thereof. The light guide may have a cross-sectional shape with an upper surface, a lower surface, a reflection region, a projection region, a concave region, a projection region, a center, ends, a radius, or a combination thereof.

The upper surface functions to reflect light, direct light towards a concave region, distribute light within the light guide, or a combination thereof. The upper surface may prevent light from exiting the light guide. The upper surface may be reflective. The upper surface may be opaque. The upper surface may extend into an article of manufacture. The upper surface may be generally arcuate. The upper surface may be hidden from view. The upper surface may include optics. The upper surface may be located opposite a lower surface. The upper surface may mirror a shape of the lower surface.

The lower surface functions to distribute light, diffuse light, partially reflect light, face an article of manufacture to be illuminated, or a combination thereof. The lower surface may be located a distance from the article of manufacture. The lower surface may be a distance of about 1 cm or more, about 2 cm or more, about 3 cm or more, about 4 cm or more, about 5 cm or more, or about 6 cm or more from the article of manufacture. The lower surface may be located a distance of about 1 m or less, about 50 cm or less, about 25 cm or less, about 15 cm or less, or about 10 cm or less form the article of manufacture. The lower surface may have a focal length where a predetermined distribution, amount, intensity, or a combination thereof of light is provided to the article of manufacture located a predetermined distance from the lower surface. The lower surface may be concave and/or include a concave region.

The concave region functions to distribute light, provide a predetermined distribution, amount, intensity, or a combination thereof of light at a predetermined distance, provide a uniform distribution, amount, intensity, or a combination thereof of light of an area of an article of manufacture, or a combination thereof. The concave region may be symmetrical. The concave region may be asymmetrical. The concave region may be arcuate, parabolic, smooth, segmented, free of angles, free of flat spots, angled, flat, or a combination thereof. The concave region has a center and two opposing ends when viewed as a cross-section.

The center functions to be a top of the concave region. The center may be an apex of the concave region. The center may be located equal distant from the two ends. The center may be asymmetrically located between the two ends. The center may be located in a first plane and the two ends located in a second plane. The ends may extend below the center so that the concave region is formed therebetween. The ends may be a terminal point of the light guide. The ends may be a location where an upper surface connects to a lower surface of the light guide. The center may be located equal distance from a first end and a second end. The concave region has a radius.

The radius functions to set an arc of the concave region, provide an distribution, amount, intensity, or a combination thereof of light to an article of manufacture, provide a predetermined distribution, amount, intensity, or a combination thereof of light on an article of manufacture a predetermined distance away, provide a uniform amount of light, provide a homogeneous distribution, amount, intensity, or a combination thereof of light, or a combination thereof. The radius may be determined by a distance between the light guide (e.g., a center, ends) and the article of manufacture. The radius may be varied depending on the application, distance, width of an article of manufacture, length of the article of manufacture, or a combination thereof. The radius may be about 1 cm or more, about 2 cm or more, about 3 cm or more, about 5 cm or more, about 7 cm or more, or a combination thereof. The radius may be about 15 cm or less, about 12 cm or less, about 10 cm or less, or about 8 cm or less. The radius may be varied along with the total height and a height between the upper surface and the lower surface of the light guide to provide light to an article of manufacture at a predetermined distance.

The heights (e.g., total height and height between centers of surfaces) functions to direct light to an article of manufacture a predetermined distance away. The heights may be a thickness (e.g. a cross-sectional thickness) of the light guide. The heights may be substantially uniform between the ends of the light guide. The heights may be greatest at the center of the light guide. The heights may reduce to a point at the ends. The heights may be a distance between the upper surface and the lower surface. The height may be a distance between a center of the upper surface and a center of the lower surface. The height may be greatest at the center between the upper surface and the center of the lower surface. The height may reduce as the upper surface approaches the lower surface at the ends. The height may be smallest at the ends. The height between centers may be smaller than a total height (e.g., a height from a center of the upper surface and an ends at of the lower surface). The height may assist in spreading light, disbursing light within the light guide, reflect light within the light guide, or a combination thereof. The height of the light guide may assist in reflecting light internally into reflection regions and then into contact with projection regions. The height may project light widthwise so that a width of article of manufacture is covered with light and light may be projected along the length to cover the length of the article of manufacture with light.

The length of the light guide functions to distribute light along a length of an article of manufacture. The length of the light guide may substantially mirror a length of the article of manufacture. The length may be of the light guide may be about 1 cm or more, about 5 cm or more, about 10 cm or more, about 15 cm or more, about 20 cm or more, about 25 cm or more, or about 30 cm or more. The length may be about 200 cm or less, 150 cm or less, about 120 cm or less, about 100 cm or less, about 90 cm or less, about 75 cm or less, about 60 cm or less, or about 50 cm or less. The length and the width of the light guide have a concave region to distribute light and reflection regions to assist the light in moving along the length of the light guide.

The reflection regions function to reflect light internally so that light is directed along the length of the light guide. The reflection regions assist in creating an internal reflection. The reflection regions may direct light in a direction of a longitudinal axis of the light guide. The reflection regions may reflect light internally. The reflection region may direct light an entire distance of the light guide. The reflection regions may prevent light from exiting the light guide. The reflection regions may be a continuous surface that prevents light from exiting. The reflection regions may be a surface that is free of optics such that light is retained within a light guide. The reflection region may direct light into contact with optics, the projection region, or both so that light is directed out of the light guide.

The projection region may be part of the concave region. The projection region may allow light to exit the concave region. The projection region may provide a uniform distribution, amount, intensity, or a combination thereof of light, a homogeneous distribution, amount, intensity, or a combination thereof of light, or both to an article of manufacture. The projection region may direct light towards an article of manufacture. The projection region may spread light. The projection region may spread light to cover substantially an entire area of the article of manufacture with a uniform or homogeneous distribution, amount, intensity, or a combination thereof of light. The projection region may direct light in a first direction and prevent light from extending in other areas different than the first direction. For example, the light is directed towards an article of manufacture and prevents from being directed adjacent to the article of manufacture. The projection region may face the article of manufacture and may project light from the concave region. The projection region may project light outward (e.g., projected light).

The projected light functions to exit the light guide and illuminate an article of manufacture. The projected light extends out of the concave region. The projected light may provide a uniform distribution, amount, intensity, or a combination thereof of light at a predetermined distance (e.g., a distance the article of manufacture is located). The projected light may be substantially uniform, homogeneous, or both at the predetermined distance. For example, the projected light may be free of hot spots, may have a lux within a range of about 5% or less or about 1% or less. The projected light provides light outside of the light guide that is not reflected internally.

The reflected light is light that is internally maintained within the light guide. The reflected light assists in moving light from the light source along the length of the light guide. The reflected light may reflect in a global direction (e.g., virtually any direction). The reflected light may bounce light around internally so that the light fills an entire volume of the light guide (e.g., length, width, height). The reflected light may be light that does not escape the light as projected light. The reflected light may contact optics and the optics may allow the reflected light to exit the light guide through the concave region.

The optics function to prevent hot spots, provide a homogenous light pattern, a homogenous distribution, amount, intensity, or a combination thereof of light, spread the light, prevent overlaps of light from light sources, direct light out of the light guide, or a combination thereof. The optics may provide a homogenous lighting appearance inside of the vehicle, on the article of manufacture, or both. The optics may be a texture be added to the light guide. For example, a texture may be sprayed on the light guide, etched into the light guide, mechanically added, mechanically formed, added during molding, added during manufacturing, or a combination thereof. The optics may be on an external surface, an internal surface, a location between the internal surface and the external surface, or a combination thereof. The optics may guide light out of the light guide as the light travels through the light guide. The optics may change a direction of the light. The optics may permit light to exit a surface (e.g., a concave region) of the light guide. The optics may be formed while the light guides are being formed. Some light guides may include a texture portion on or in an external surface and an internal surface. The optics (e.g., micro-optics) may create an area where light exits the light guide, the concave region, or both. The optics may permit light to extend out of the concave region, change directions within the light guide to be directed out of the light guide, or both. The optics may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The optics may extend substantially a same length, a same width, or both as the light guide. The optics may terminate at a texture shutoff such that the optics do not extend beyond the textured shutoff. The textured shutoff may be a region where the optics ends and the light does not extend out of the substrate. The optics may be located on an upper surface, the lower surface, or both. The optics may include reflecting surfaces, redirecting surfaces, or both.

The reflecting surfaces of the optics may assist in maintaining some light inside of the light guide, along a length of the light guide, or both. The reflecting surfaces may direct light at an angle relative to the concave region such that the light does not pass out of the concave region. The reflecting surfaces may direct light at any angle, relative to the concave region except for orthogonal. The reflecting surfaces of the optics may direct light towards reflection regions so that the reflection regions continue to reflect the light within and along the light guide. The reflecting surfaces may be optics such as a shaped prism, texture, or both with an angle of orientation that allows light to internally reflect within the light guide. The reflecting surfaces may be flat or have a shape. The reflecting surfaces may internally reflect light. The reflecting surfaces may be located adjacent to the redirection surfaces.

The redirecting surfaces function to direct light out of the light guide. The redirecting surfaces direct light out of the light guide, out of the concave region, or both. The redirecting surfaces may direct light orthogonal to the concave region, the lower surface, or both. The redirecting surfaces may direct light at an angle so that the light passes through the lower surface and is not reflected by the lower surface. The redirecting surface may direct the light at an angle so that the light extends out of the lower surface, the concave region, or both. The redirecting surface may direct some light out of the light guide and reflect some light. The redirecting surface may have a shape that changes an angle of the light so that some light is projected out of the light guide. The redirecting surface may have a shape that is symmetrical, asymmetrical, triangular, square, domed, at an angle, or a combination thereof. The shape may be a triangle that is scalene, acute, right, obtuse, isosceles, equilateral, or a combination thereof. The shape of the optics may vary from end to end of the light guide. The optics may be smallest closest to the light source and larger at an end opposite (e.g., second end) the light source. The optics may vary in size from end to end of the light guide. The shape of the optics may extend at an angle. The optics may have two surfaces with an angle therebetween. The angle between surfaces of optics may be about 15 degrees or more, about 25 degrees or more, about 45 degrees or more, about 60 degrees or more, about 75 degrees or more, or about 90 degrees or more. The angle between surfaces of the optics may be about 180 degrees or less, about 160 degrees or less, about 145 degrees or less, about 135 degrees or less, about 115 degrees or less, or about 105 degrees or less. They angle may be any angle that assists light in leaving the light guide. The redirecting surface may direct light to the concave region so that the light is distributed on an article of manufacture.

The light distribution functions to illuminate an article of manufacture, provide light to an area so that the user of the vehicle may see components of the vehicle, to provide ornamentation to the article of manufacture, or a combination thereof. The light distribution may be substantially uniform, homogeneous, or both. The light distribution may be about 50 lux or more, about 100 lux or more, about 200 lux or more, about 300 lux or more, or about 450 lux or more when measured at the article of manufacture. The light distribution may be about 1000 lux or less, about 750 lux or less, or about 500 lux or less when measured at the article of manufacture.

The controllers function to control the light sources or the lights within a light source individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. The controller may be programmable, include pre-set programs, or both. The controller may be accessed inside of the vehicle so that the user can change the illumination settings (e.g., colors, brightness, intensity) of the light system. The controller may communicate with light sources through one or more printed circuit boards.

The light sources (and lights) may be located on or connected to one or more printed circuit boards. The printed circuit boards (PCB) may provide power, signals, support, or a combination thereof to one or more light sources. The PCB may be fixed within a light system. Each PCB may be connected to a plurality of light sources. The PCB may be electrically connected, mechanically connected, or both to one or more light sources discussed herein. The PCBs may aim the light from the light sources. The PCBs may align a light source with a light guide.

FIG. 1 is a side isometric view of a vehicle 2 interior 4. The interior 4, as shown, includes a side 6 and a front 8. The side 6 and the front 8 are both articles of manufacture 10 that include a light system 12 and 12' respectively. The light system 12 on the side 6 has an illuminated region 14 that illuminates all or a portion of a door panel 16 of the side 6 of the vehicle 2. The light system 12 guides the light to a specific area so that a desired area is illuminated by the illuminated region 14. The light system 12' on the front 4 has an illuminated region 14' that illuminates a forward panel including a glove box 18. The illuminated regions 14, 14' specifically cover a desired area with a substantially uniform distribution, amount, intensity, or a combination thereof of light.

Figure 2A:
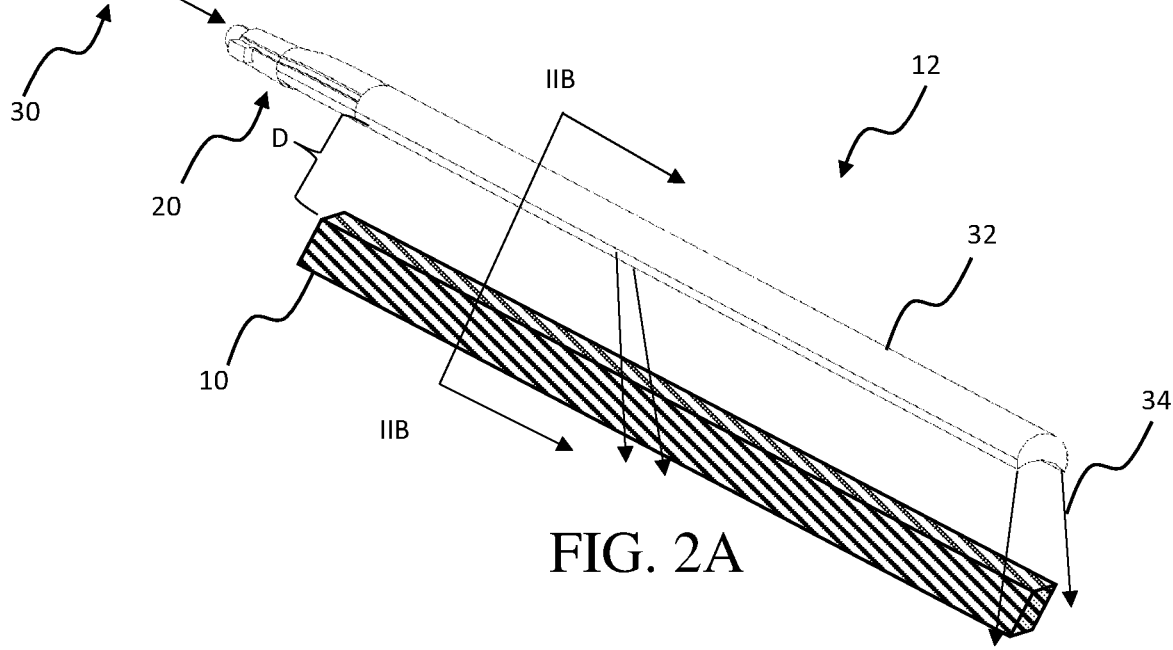
FIG. 2A is an isometric view of a light guide directing light to a component.

FIG. 2A is an isometric view of a light system 12 located adjacent to an article of manufacture 10. The light system 12 includes a guiding device 20 that receives light from a light source 30 and guides the light into a light guide 32. The light from the light source 30 is directed into the guiding device 20 so that the light is distributed by the light guide 32 as projected light 34 onto and/or around the article of manufacture 10 so that the article of manufacture 10 is illuminated. The light guide 32 and the article of manufacture 10 are spaced apart a distance (D).

Figure 2B:
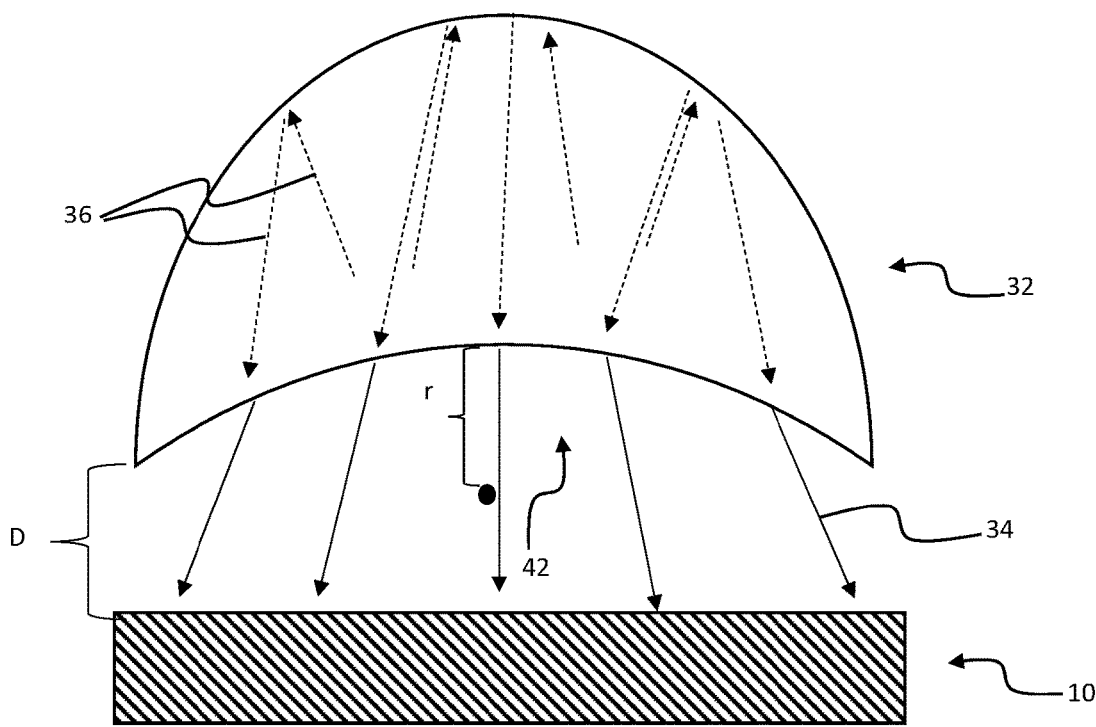
FIG. 2B is a cross-sectional view of the light guide and the component of FIG. 2A along lines IIB-IIB.

FIG. 2B is a cross-sectional view of the light guide 32 of FIG. 2A along lines IIB-IIB. The light guide 32 guides light along a length thereof by redirecting the light internally before the light is projected out of the light guide 32 as projected light 34. As the light extends longitudinally through the light guide 32 the light is internally reflected until the internal reflection is broken so that the light direction changes and the light is redirected light 36 that is guided out of the light guide 32 towards the article of manufacture 10 as projected light 34. The light guide 32 and the article of manufacture 10 are located a distance (D) from each other where the article of manufacture 10 is entirely covered with a uniform distribution, amount, intensity, or a combination thereof of light. As shown, the light guide 32 has a concave region 42 where the projected light 34 extends out. The concave region 42 as shown is a smooth continuous arcuate segment with a radius (r).

Figure 3A:
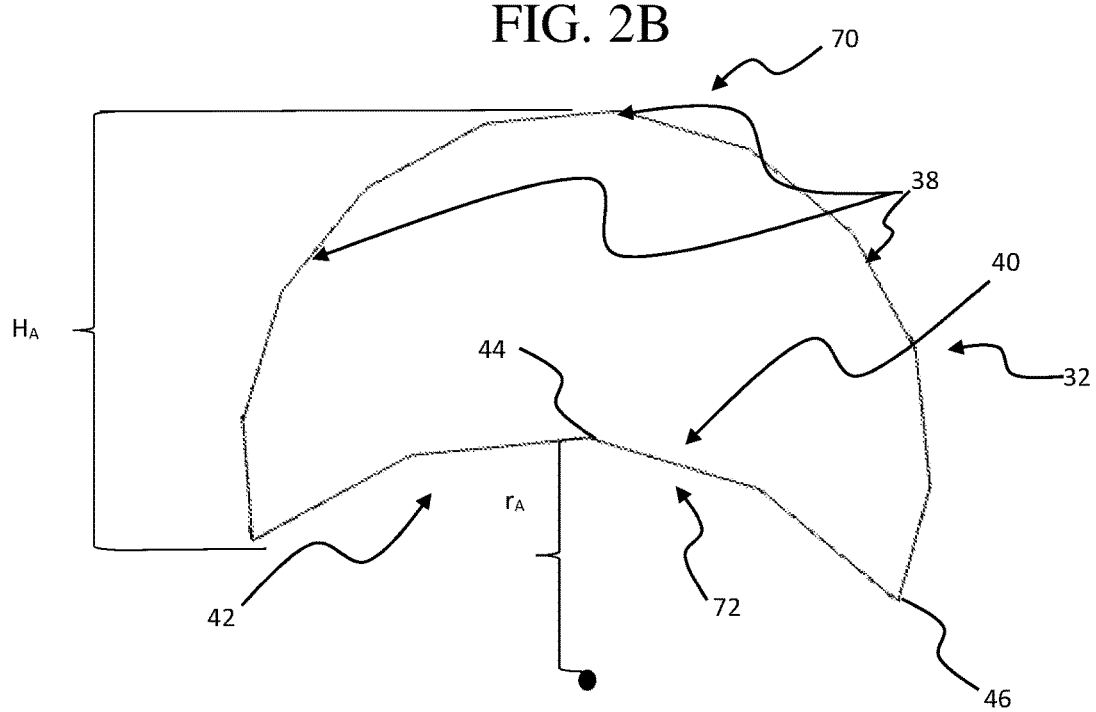
FIG. 3A illustrates a cross-sectional view of a light guide.

FIG. 3A is a cross-sectional view of a light guide 32. The light guide 32 includes an upper surface 70 and a lower surface 72. The upper surface 70 includes a reflection region 38. The lower surface 72 includes a projection region. The reflection region 38 directs some of the light along an axis of the light guide 32 and some of the light out of the light guide 32 through the projection region 40 to illuminate an article of manufacture (not shown). The projection region 40 is the concave region 42 in the lower surface 72. As shown, the perimeter of the cross-section of the light guide 32 has a segmented curvature; however, the perimeter may be a smooth continuous arc that is free of angles and segments. The light guide has a height ($H_A$) and a radius ($r_A$). The height ($H_A$) and the radius ($r_A$) may be varied along with the distance (D) the light guide 32 is located from the article of manufacture as is shown in FIG. 2B. The concave region 42 has a center 44 located between two ends 46.

Figure 3B:
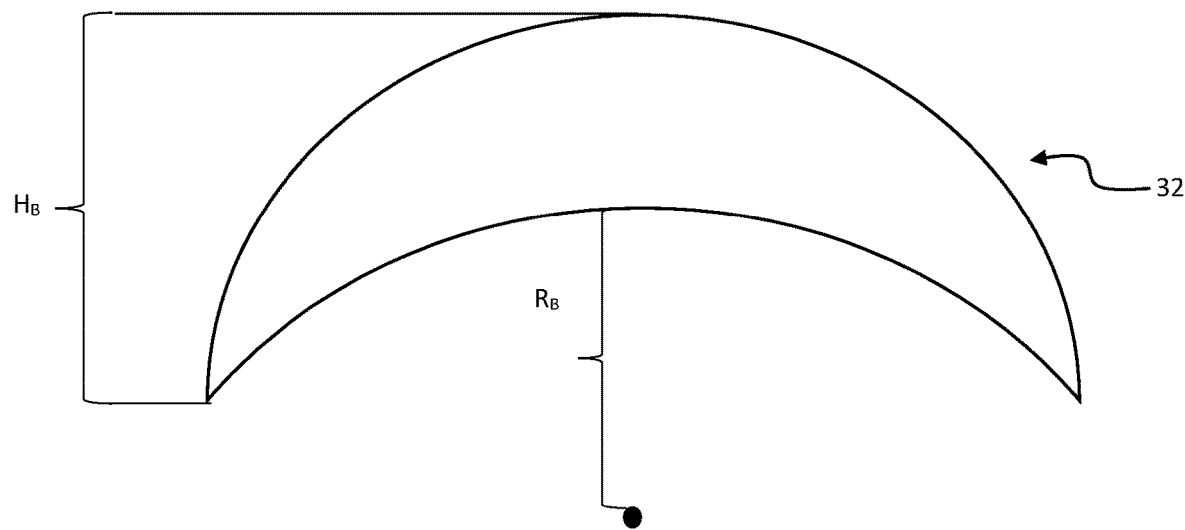
FIG. 3B is a cross-sectional view of a thin light guide.

FIG. 3B is a crescent moon shaped light guide 32. The light guide 32 has a height ($H_B$) and a radius ($r_B$).

Figure 3C:
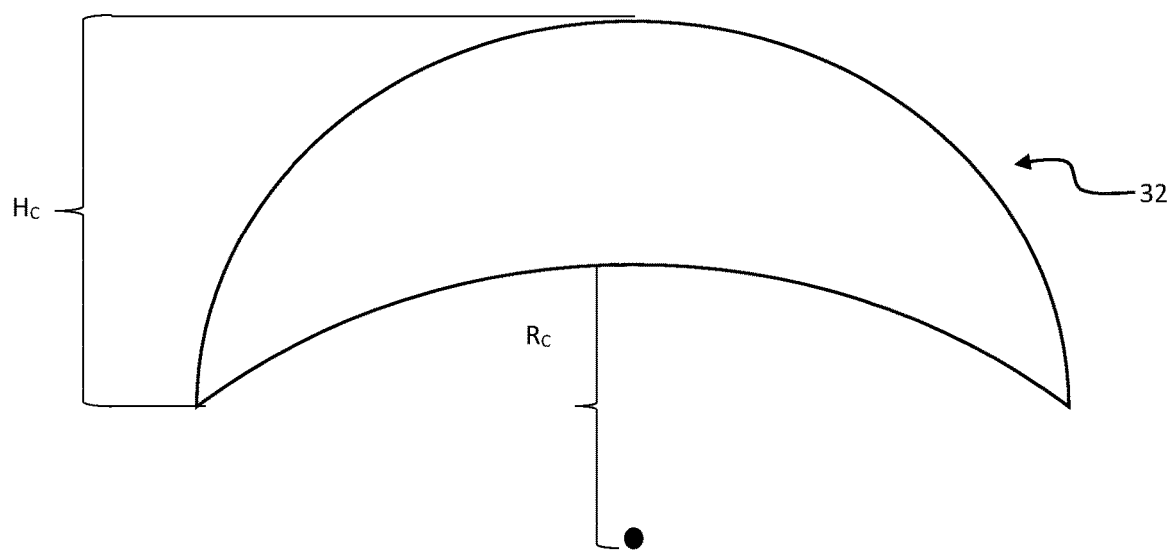
FIG. 3C is a cross-sectional view of an intermediate light guide.

FIG. 3C is a light guide 32 also having a crescent moon shape similar to the light guide 32 of FIG. 3B. The light guide 32 of FIG. 3C has a height ($H_C$) that is larger than the height ($H_B$) of the light guide 32 of FIG. 3B. The light guide 32 of FIG. 3C has a radius (r c) that is smaller than the radius ($r_B$) of the light guide 32 of FIG. 3B.

Figure 3D:
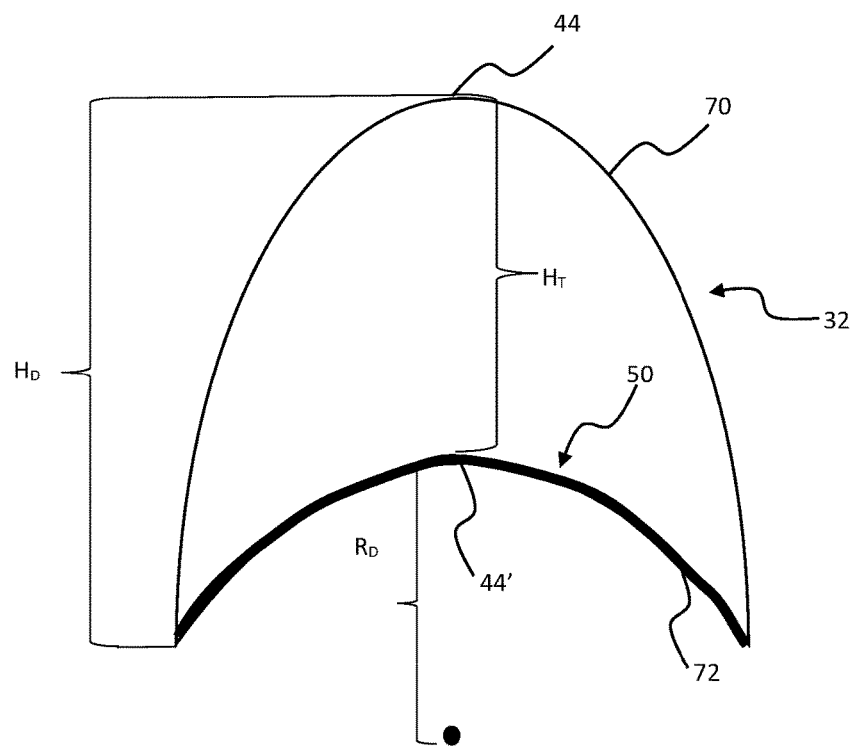
FIG. 3D is a cross-sectional view of thick light guide.

FIG. 3D is a light guide 32 having a total height ($H_D$) and a radius ($r_D$). The total height ($H_D$) of the light guide 32 of FIG. 3D is greater than the total height of ($H_A$), ($H_B$), and ($H_C$). The radius ($r_D$) of the light guide 32 of FIG. 3D is greater than the radius of ($r_A$), ($r_B$), and ($r_C$). Thus, as illustrated in FIGS. 3A-3D the total height (e.g., thickness) and radius of the light guide 32 can be varied depending on a size of the article to be illuminated and a distance between the article and the light guide 32. The light guide 32 includes optics 50 on the lower surface 72 that assist in guiding light out of the light guide 32 to a desired location. The light guide 32 has an upper surface 70 with a center 44 and a lower surface 72 with a center 44'. The distance (HT) between the center 44 and the center 44'

Figure 4A:
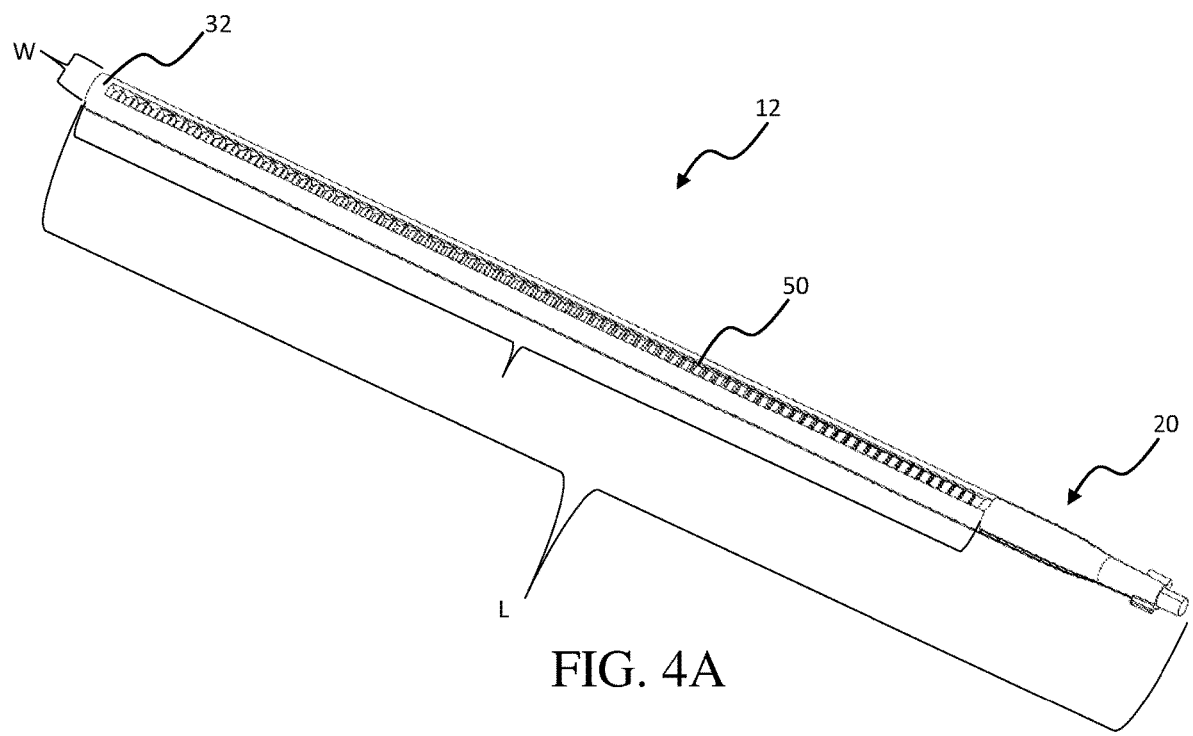
FIG. 4A is an isometric view of a light guide including optics.
Figure 4B:
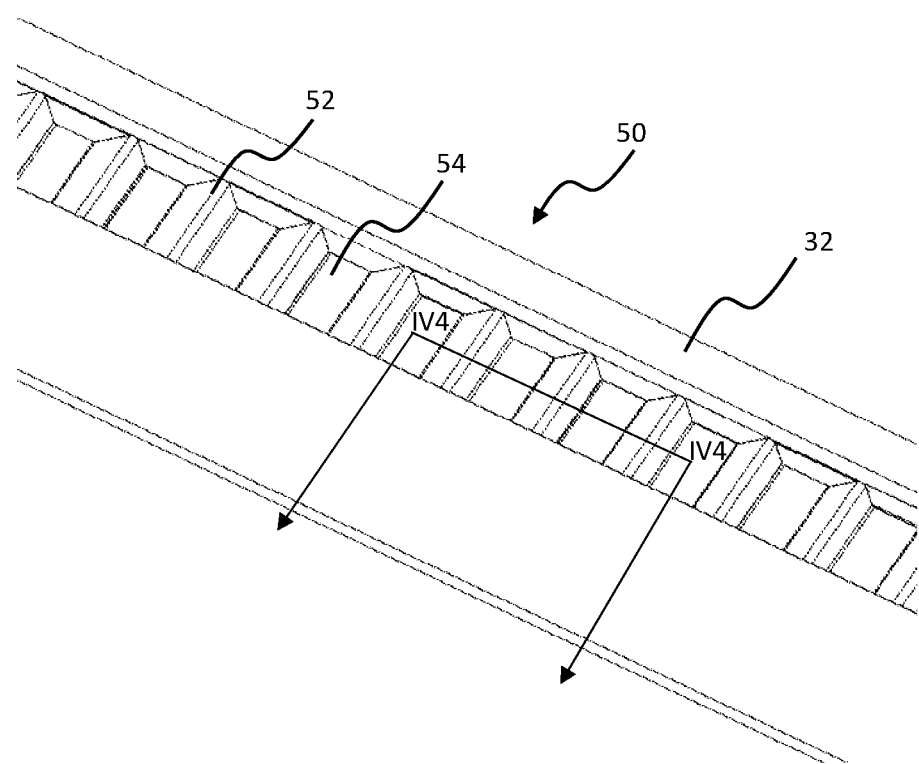
FIG. 4B is a close-up view of the optics of FIG. 4A.

FIG. 4A is an isometric view of a light system 12 with a guiding device 20 connected to a light guide 32. The light guide 32 includes optics 50 that extend along an upper surface of the light guide 32. The light system 12 has a width (W) and a total length (L) with the light guide 32 and the optics 50 having a length ($L_G$). The optics 50 stop some or all of the internal reflection FIG. 4B is a close-up view of the optics 50 in the light guide 32 of FIG. 4A. The optics 50 include a reflecting surface 52 that is illustrates as having a triangular shape and a redirecting surface 54 that is illustrated as being flat. The reflecting surface 52 and the redirecting surface 54 alternate with one another to form the optics 50 that reflect and redirect light within the light guide 32.

Figure 4C:
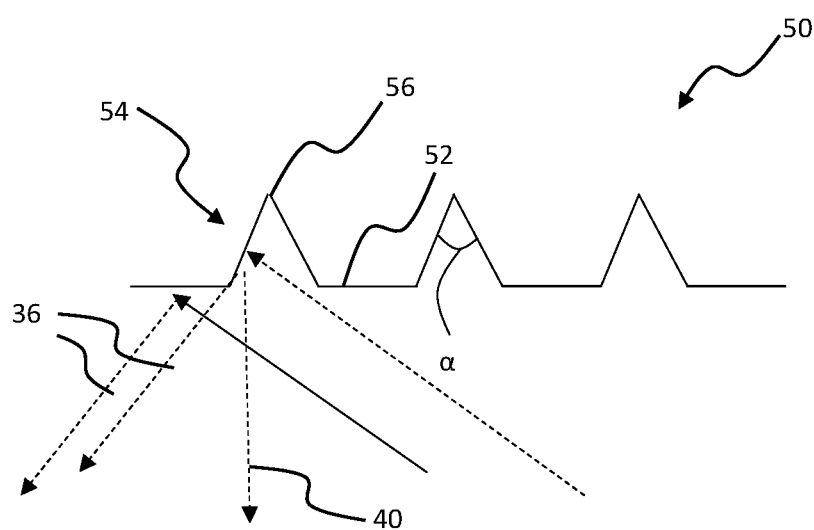
FIG. 4C is a cross-sectional view of the optics of FIG. 4B along lines IVB-IVB.

FIG. 4C is a cross-sectional view of the optics 50 of FIG. 4B along lines IVC-IVC. The optics 50 include the reflecting surfaces 52 and redirecting surfaces 54. The redirecting surfaces 50 come to a point 56 and have an angle (a). The optics 50 include reflecting surfaces 54, which are substantially flat and are located alternatingly between the redirecting surfaces 54. The reflecting surfaces 52 cause light to reflect internally as reflected light 36. The redirecting surfaces 54 redirect light so that some light is reflected light 36 and some light is projected light that extends out of the light guide.

Figure 5:
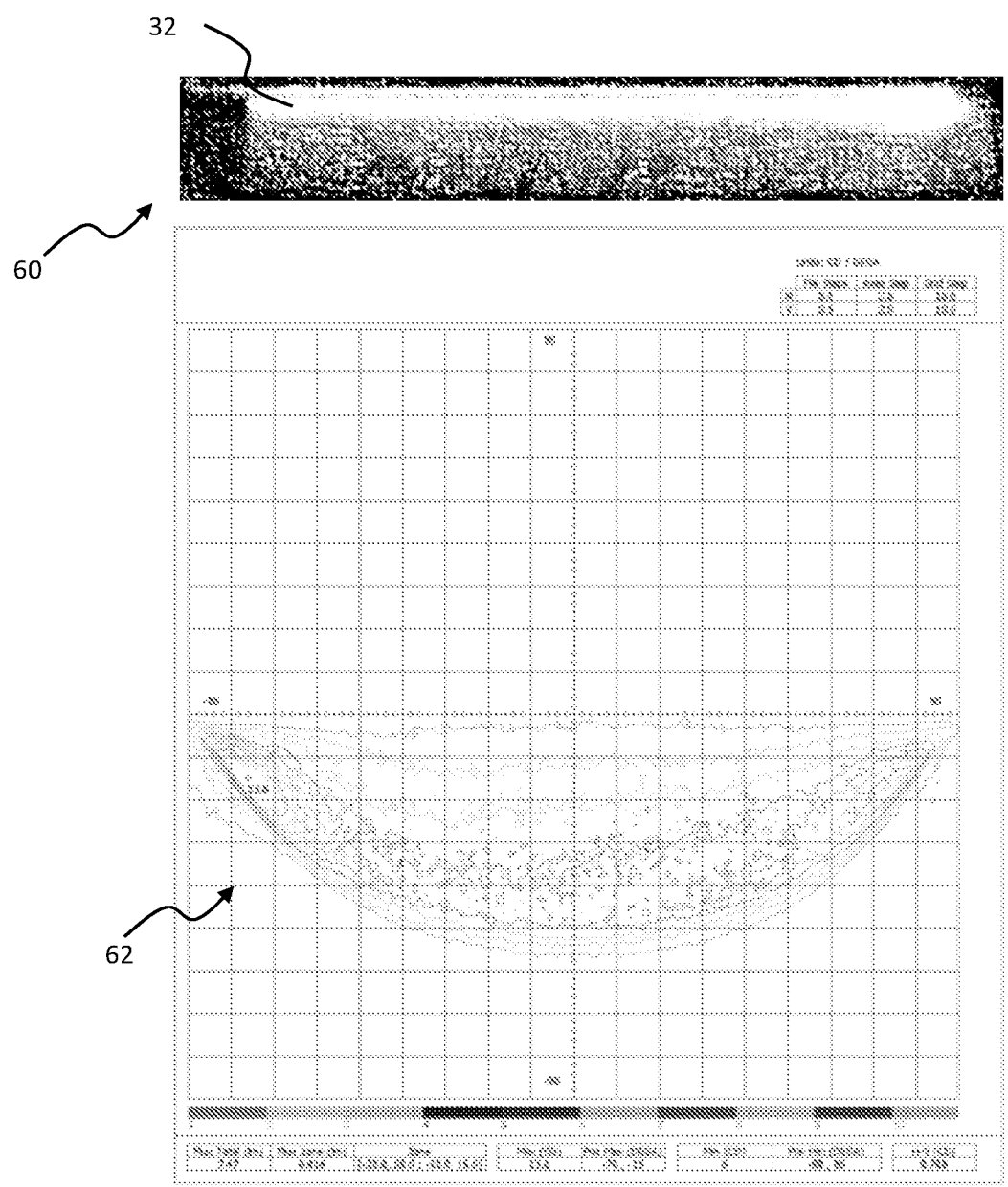
FIG. 5 is a side view of an illuminated light guide and a distribution of the light from the light guide on a component.

FIG. 5 is a side view of an illuminated light guide 60 where a length of the illuminated light guide 60 have a substantially uniform distribution, amount, intensity, or a combination thereof of light extending from the light guide 32. Below the illuminated light guide 60 is a light distribution 62. As shown, the light distribution 62 is substantially homogeneous from −90 to 90 so that light projected from the light guide is substantially uniform on an article of manufacture (e.g., a location of reading/interest).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Interior
6 Side
8 Front
10 Article of Manufacture
12 Light System
14 Illuminated Region
16 Door Panel
18 Glove Box
20 Guiding Device
30 Light Source
32 Light Guide
34 Projected Light
36 Reflected Light
38 Reflection Region
40 Projection Region
42 Concave Region
44 Center
46 Ends
50 Optics
52 Reflecting Surface
54 Redirecting Surface
60 Illuminated Light Guide
62 Light Distribution
70 Upper Surface
72 Lower Surface
D Distance Between Guide and AOM
R Radius
L Length of Light Guide
W Width of Light Guide
H Height of The Light Guide

We claim:
1. A light system comprising:
a light source; and
a light guide aligned with the light source so that light from the light source directs light into the light guide, wherein the light guide has a concave region that light extends through so that the light extending from the concave region homogeneously illuminates an article of manufacture within an interior of a vehicle;
wherein the light guide has an upper surface and a lower surface with a height located between the upper surface and the lower surface; and
wherein the upper surface includes optics that redirect the light out of the concave region.
2. The light system of claim 1, further comprising:
a guiding device connected to an end of the light guide, the guiding device directing the light from the light source into the light guide.

3. The light system of claim 1, wherein the concave region of the light guide has a center located between two ends so that the concave region is arcuate and includes a radius.

4. The light system of claim 3, wherein the radius at the center and the radius at the two ends are equal.

5. The light system of claim 4, wherein the radius is about 2 mm to about 5 cm.

6. The light system of claim 1, wherein the height is about 2 mm to about 5 cm.

7. The light system of claim 1, wherein the light guide is configured to be located within about 15 cm or less and about 2 cm or more from the article of manufacture so that the article of manufacture is homogeneously illuminated.

8. The system of claim 1, wherein the light guide includes a length and a width and a substantially homogeneous distribution, amount, intensity, or a combination thereof of light extends out of the concave region along the length and the width to homogeneously illuminate the article of manufacture.

9. A light system comprising:
a light source; and
a light guide aligned with the light source so that light from the light source directs light into the light guide, wherein the light guide has a concave region that light extends through so that the light extending from the concave region homogeneously illuminates an article of manufacture within an interior of a vehicle;
wherein the light guide has an upper surface and a lower surface with a height located between the upper surface and the lower surface; and
wherein the lower surface includes optics that redirect the light out of the concave region.

10. The light system of claim 9, wherein the optics include a reflecting surface and a redirecting surface.

11. The light system of claim 10, wherein the reflecting surface extends at an angle relative to the redirecting surface.

12. The light system of claim 10, wherein the redirecting surface is planar.

13. The light system of claim 10, wherein the reflecting surface has a triangular cross-sectional shape.

14. A light system comprising:
a light source;
a guiding device; and
a light guide in communication with the guiding device that light from the light source extends into the light guide through the guiding device and extends along a length of the light guide, wherein the light guide comprises:
an upper surface extending along the length and
a lower surface extending along the length opposite the upper surface with the lower surface including a concave region formed in the lower surface along the length of the light guide so that light directed through the concave region provides a uniform distribution, amount, intensity, or a combination thereof of light to an article of manufacture within an interior of a vehicle;
wherein the light guide is configured to be located a predetermined distance from the article of manufacture to provide the uniform distribution, amount, intensity, or a combination thereof of light on the article of manufacture.

15. The light system of claim 14, wherein the concave region is generally arcuate.

16. The light system of claim 14, further comprising optics that break an internal reflection and direct the light from a direction parallel to the length of the light guide to a direction towards the concave region and out of the concave region towards the article of manufacture.

17. The light system of claim 14, wherein the homogeneous light has an intensity from about 50 lux to at about 1000 lux at the article of manufacture and the homogeneous light is free of hot spots.

18. The light system of claim 14, wherein the concave region spreads the light a distance of about 1 cm or more and about 15 cm or less.

19. The light system of claim 14, wherein the concave region of the light guide has a center located between two ends so that the concave region is arcuate and includes a radius.

20. The light system of claim 14, wherein the radius at the center and the radius at the two ends are equal.

* * * * *